United States Patent
Kuang et al.

(10) Patent No.: US 9,467,039 B2
(45) Date of Patent: Oct. 11, 2016

(54) POWER SUPPLY SYSTEM WITH RIPPLE SUPPRESSION CIRCUIT AND RIPPLE SUPPRESSION METHOD THEREOF

(71) Applicant: Chengdu Monolithic Power Systems Co., Ltd., Chengdu (CN)

(72) Inventors: Naixing Kuang, Hangzhou (CN); Zilin Fan, Hangzhou (CN); Yuancheng Ren, Hangzhou (CN)

(73) Assignee: CHENGDU MONOLITHIC POWER SYSTEMS CO., LTD., Chengdu (CN)

( * ) Notice: Subject to any disclaimer, the term of this patent is extended or adjusted under 35 U.S.C. 154(b) by 0 days.

(21) Appl. No.: 14/842,724

(22) Filed: Sep. 1, 2015

(65) Prior Publication Data

US 2016/0065051 A1 Mar. 3, 2016

(30) Foreign Application Priority Data

Sep. 1, 2014 (CN) .......................... 2014 1 0440671

(51) Int. Cl.
*H05B 37/02* (2006.01)
*H02M 1/14* (2006.01)
*H05B 33/08* (2006.01)

(52) U.S. Cl.
CPC ........... *H02M 1/14* (2013.01); *H05B 33/0809* (2013.01); *H05B 33/0845* (2013.01)

(58) Field of Classification Search
CPC .. H05B 37/02; H05B 33/08; H05B 33/0809; H05B 33/0845; H02M 1/14
USPC ............ 315/186, 209 R, 224, 291, 294–299, 315/307, 308, 312, 360, 362
See application file for complete search history.

(56) References Cited

U.S. PATENT DOCUMENTS

| | | | |
|---|---|---|---|
| 7,876,074 B2 * | 1/2011 | Stanley | ..................... H03F 1/32 323/222 |
| 2010/0085784 A1 * | 4/2010 | Chou | ..................... H02M 3/156 363/45 |
| 2014/0176017 A1 | 6/2014 | Kuang et al. | |

* cited by examiner

*Primary Examiner* — Jimmy Vu (57) ABSTRACT

A ripple suppression circuit has a filter circuit and a follower circuit. The filter circuit has a first input terminal coupled to a signal source to receive a ripple signal and an output terminal to output a filter signal which is the sum of the average value of the ripple signal and a positive bias signal. The follower circuit has a first input terminal, a second input terminal and an output terminal, wherein the first input terminal is coupled to the signal source to receive the ripple signal, the second input terminal is coupled to the output terminal of the filter circuit to receive the filter signal, the follower circuit provides an output signal at the output terminal, the output signal at least partially follows the filter signal.

17 Claims, 7 Drawing Sheets

POWER SUPPLY SYSTEM WITH RIPPLE SUPPRESSION CIRCUIT AND RIPPLE SUPPRESSION METHOD THEREOF

CROSS-REFERENCE TO RELATED APPLICATION(S)

This application claims the benefit of CN application No. 201410440671.X, filed on Sep. 1, 2014, and incorporated herein by reference.

TECHNICAL FIELD

The present invention refers to electrical circuit, to be more specific but not exclusively refers to power supply system with ripple suppression.

BACKGROUND

Light Emitting Diode (LED) is widely used as a light source for advantages of low power dissipation and high light efficiency. A prior art LED power supply system adopts a single stage Power Factor Correction (PFC) voltage converter to drive LED. However, a single stage PFC voltage converter usually contains high output ripple. In order to decrease the ripple, a prior art solution adopts a large capacitor with high capacitance at the output of the voltage converter. However, this solution requires a large electrolyte capacitor which consumes large space and has short lifetime, and shortens the lifetime of the LED power supply system dramatically.

A prior art solution adopts small output capacitor with additional ripple suppression circuit for suppressing the output ripple. However, a traditional ripple suppression circuit is energy consuming and has low system efficiency.

SUMMARY

The embodiments of the present invention are directed to a power supply system with a ripple suppression circuit comprising a signal source and a ripple suppression circuit. The signal source is configured to output a ripple signal. The ripple suppression circuit comprises a filter circuit and a follower circuit, wherein the filter circuit has a first input terminal coupled to the signal source to receive the ripple signal and an output terminal configured to output a filter signal which is the sum of the average value of the ripple signal and a positive bias signal, and wherein the follower circuit has a first input terminal coupled to the signal source to receive the ripple signal, a second input terminal coupled to the filter circuit to receive the filter signal and an output terminal configured to provide an output signal to a load, wherein the output signal at least partially follows the change of the filter signal.

BRIEF DESCRIPTION OF THE DRAWINGS

Non-limiting and non-exhaustive embodiments are described with reference to the following drawings. The drawings are only for illustration purpose. Usually, the drawings only show part of the system or circuit of the embodiments.

The use of the same reference label in different drawings indicates the same or like components.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

The phrase "couple" includes direct connection and indirect connection. Indirect connection includes connection through conductor which has resistance and/or parasitic parameters such as inductance and capacitance, or connection through diode, and so on.

Figure 1:
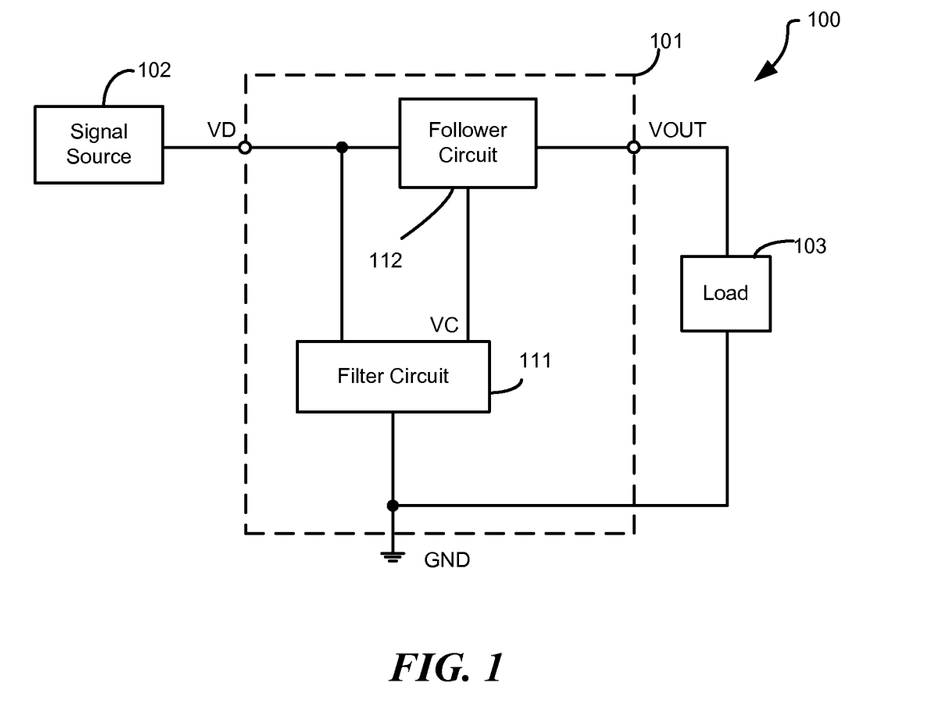
FIG. 1 illustrates a diagram of a power supply system 100 with ripple suppression circuit according to an embodiment of the present invention.

FIG. 1 illustrates a diagram of a power supply system 100 with ripple suppression circuit according to an embodiment of the present invention. The power supply system 100 comprises a signal source 102, a ripple suppression circuit 101 and a load 103.

The signal source 102 has an output terminal configured to provide a ripple signal VD that contains ripple. The signal source 102 can be any type or in any form, such as an adapter, a chip, a circuit module, a wire or other type of conductor. The ripple can be in any form or level that makes the waveform of the signal source 102 not an ideal straight line. In one embodiment, the signal source 102 comprises a voltage converter which converts an input voltage into a direct-current (DC) voltage as the ripple signal VD outputted at the output terminal. In one embodiment, the voltage converter converts an alternating-current (AC) voltage VAC into a DC ripple signal VD. In another embodiment, the voltage converter converts a DC input voltage VIN into a DC ripple signal VD.

The ripple suppression circuit 101 is coupled between the signal source 102 and the load 103, and generates an output signal VOUT at the output. The ripple suppression circuit 101 is used to decrease the ripple contained in the ripple signal VD, and provide the output signal VOUT to the load 103. The ripple suppression circuit 101 comprises a filter circuit 111 and a follower circuit 112.

The filter circuit 111 has an input terminal and an output terminal. The input terminal of the filter circuit 111 is coupled to the signal source 102 and receives the ripple signal VD. The output terminal of the filter circuit 111 provides a filter signal VC. The filter circuit 111 filters the ripple signal VD and outputs the filter signal VC. The filter signal VC is a sum of the average of the ripple signal VD and a positive bias signal. The ripple of the filter signal VC is much smaller than the ripple of the ripple signal VD, thus in the text the filter signal VC is represented in the form of a constant value.

The follower circuit 112 makes the output signal VOUT at least partially follow the filter signal VC. Or in other words, the waveform or the envelope of the output signal VOUT is at least partially the same or similar with the filter signal VC. The follower circuit 112 has a first input terminal, a second input terminal and an output terminal, where the first input terminal is coupled to the signal source 102 configured to receive the ripple signal VD, the second input terminal is coupled to the output terminal of the filter circuit 111. The output terminal of the follower circuit 112 is coupled to the load 103, and provides the output signal VOUT to the load 103. Wherein the output signal VOUT is generated based on the filter signal VC, and at least partially follows the change of the filter signal VC, thus is smooth and the ripple is suppressed.

Because the output signal VOUT at least partially follows the waveform shape of the filter signal VC, and also because the positive bias signal added to the filter signal VC makes the filter signal VC higher than the average value of the ripple signal VD, the difference at the two terminals of the follower circuit 112 is decreased substantially, and the power consumed by ripple suppression circuit 101 is decreased, and thus is power efficient.

In one embodiment, the load 103 comprises LED device. In one embodiment, the load 103 comprises a LED string having a plurality of LEDs coupled in series. In another embodiment, the load 103 comprises a plurality of LED strings coupled in parallel. In yet another embodiment, the load 103 is a single LED. In some other embodiments, the load 103 comprises multiple LEDs other than the aforementioned configurations or comprises other types of load with any configuration.

In one embodiment, the power supply system 100 comprises a dimming switch which regulates the current of the load 103 by performing ON and OFF actions. In one embodiment, the dimming switch comprises a bidirectional controlled silicon switch (TRIAC), and the bias signal is at least partially determined by the conduction angle of the TRIAC.

Figure 2:
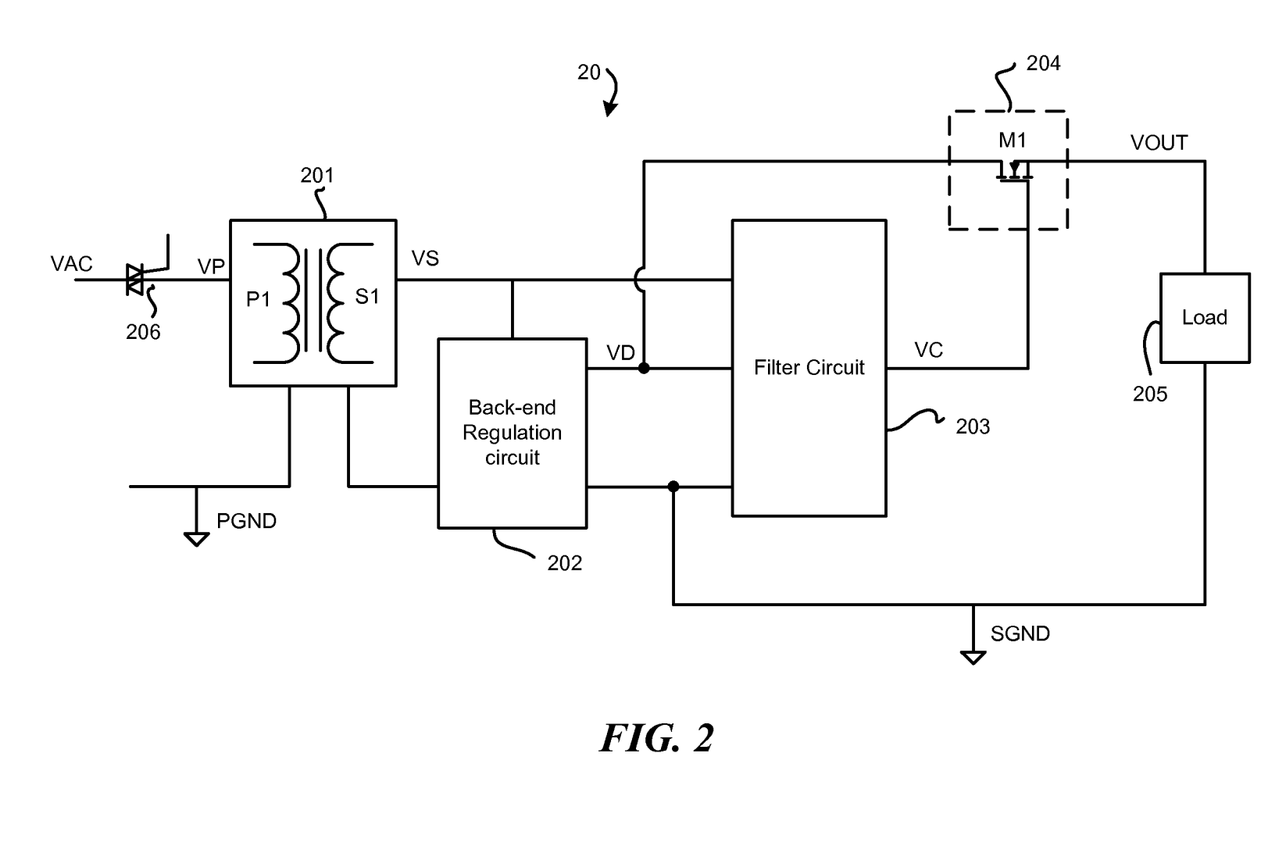
FIG. 2 illustrates a block diagram of an isolated power supply system 20 with ripple suppression circuit according to an embodiment of the present invention.

FIG. 2 illustrates a block diagram of an isolated power supply system 20 with ripple suppression circuit according to an embodiment of the present invention. The isolated power supply system 20 comprises a transformer 201, a back-end regulation circuit 202, a ripple suppression circuit comprising a filter circuit 203 and a follower circuit 204, and a load 205. In the shown embodiment, the ripple signal VD, the filter signal VC, the bias signal and the output signal VOUT are all voltage signals, and thus in the following text, they are referred to as the ripple voltage VD, the filter voltage VC, the bias voltage and the output voltage VOUT respectively.

In one embodiment, the transformer 201 comprises a primary winding P1 and at least one secondary winding S1. The primary winding P1 and the secondary winding S1 isolate the isolated power supply system 20 into the primary side part and the secondary side part. The primary winding P1 has a dotted terminal and a non-dotted terminal, wherein the dotted terminal is configured to receive a primary voltage VP, the non-dotted terminal is coupled to the primary ground PGND. The secondary winding S1 outputs a secondary voltage VS at its one terminal. In some embodiments, the primary voltage VP is a DC voltage obtained by rectifying and filtering an AC voltage. In the shown embodiment, the secondary voltage VS is provided at the dotted terminal of the secondary winding S1. However, in another embodiment, the secondary voltage VS is provided at its non-dotted terminal.

The back-end regulation circuit 202 is coupled to the two terminals of the secondary winding S1 and the secondary ground SGND, and is configured to provide the ripple signal VD that contains ripple. The filter circuit 203 has a first input terminal configured to receive the ripple signal VD. In the shown embodiment, the filter circuit 203 further comprises a second input terminal and a third input terminal, wherein the second input terminal is configured to receive the secondary voltage VS, the third input terminal is coupled to the secondary ground SGND. The filter circuit 203 provides a filter signal VC based on the secondary voltage VS and the ripple signal VD. In the shown embodiment, the follower circuit 204 comprises a metal oxide semiconductor field effect transistor ("MOSFET") M1, wherein the gate of MOSFET M1 is configured to receive the filter signal VC as the first input terminal of the follower circuit 204, the drain of MOSFET M1 is configured to receive the ripple signal VD as the second input terminal of the follower circuit 204, and the source of MOSFET M1 is configured to provide an output signal VOUT as the output terminal of the follower circuit 204. In other embodiments, the follower circuit 204 may comprise other suitable device or circuit, such as a metal semiconductor field-effect transistor ("MESFET"). The load 205 is coupled between the output terminal of the follower circuit 204 and the secondary ground SGND.

In some embodiments, the bias signal is at least partially determined by the voltage drop across the secondary winding. In one embodiment, the isolated power supply system 20 is an isolated converter, the secondary voltage VS is determined by the input voltage, the switching frequency of the isolated power supply system 20 and the turn ratio of the transformer 201.

In some embodiments, the isolated power supply system 20 further comprises an optional dimming switch 206. In the shown embodiment, the dimming switch 206 comprises a TRIAC located in the primary side part. In one embodiment, the TRIAC has a terminal coupled to the primary winding P1 through a rectifier bridge (not shown). The secondary voltage VS is also determined by the conduction angle of the TRIAC. A person of ordinary skill in the art should know that in other embodiments, the dimming switch 206 may comprise other suitable device or circuit, e.g. a MOSFET located in the primary side part and controlled by a pulse modulation (PWM) signal.

In one embodiment, the bias signal increases when the conduction angle of the dimming switch 206 increases, and the bias signal decreases when the conduction angle of the dimming switch 206 decreases.

Figure 3:
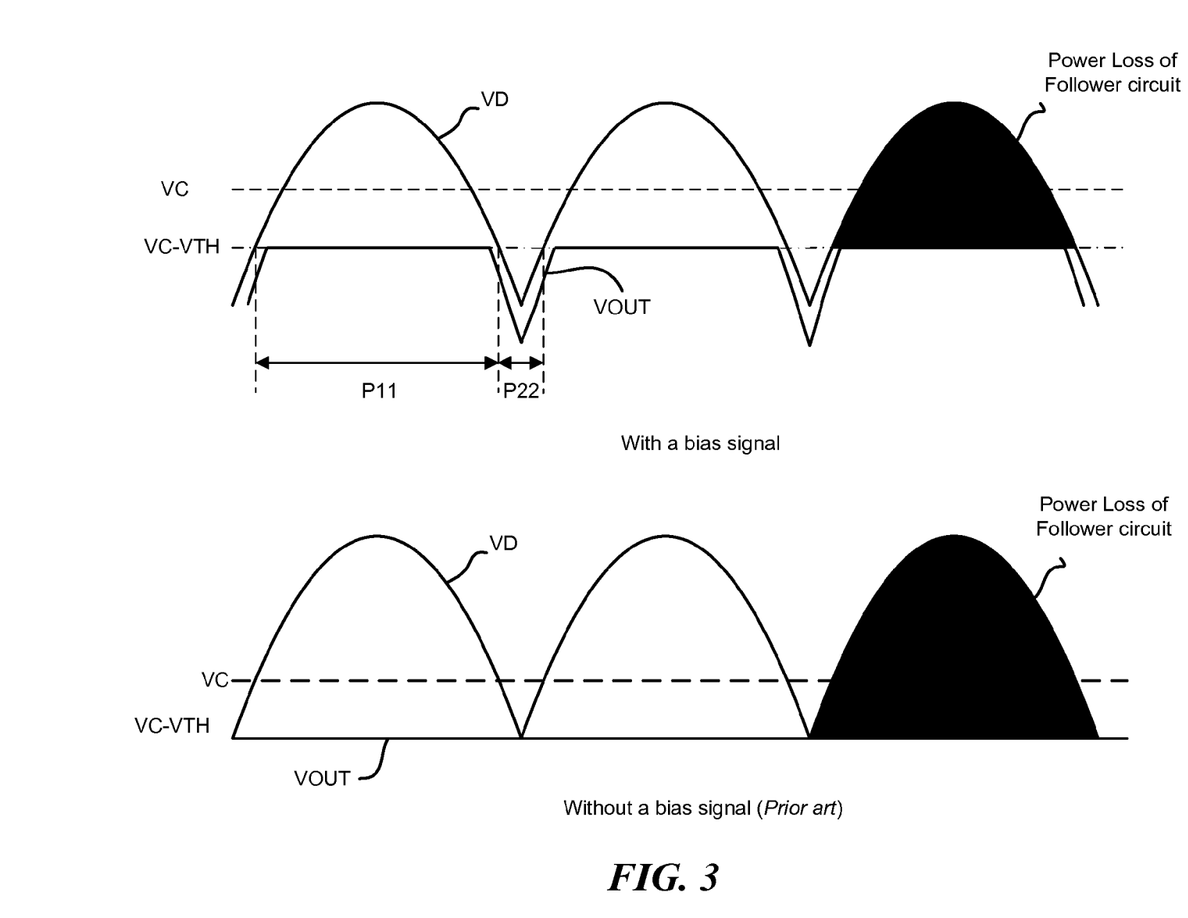
FIG. 3 illustrates a working waveform diagram for an isolated power supply system 20 with ripple suppression circuit with reference in FIG. 2, according to an embodiment of the present invention.

FIG. 3 illustrates a working waveform diagram for an isolated power supply system 20 with ripple suppression circuit with reference in FIG. 2, according to an embodiment of the present invention. An operation of the ripple suppression circuit of the isolated power supply system 20 will be described below with reference to FIG. 3. A person of ordinary skill in the art should know that the descriptions of the following embodiments according to the present invention are provided for illustration only, and not for the purpose of limiting the invention, the scope of this invention is to be limited by the appended claims.

As shown in FIG. 3, when the isolated power supply system 20 works, the back-end regulation circuit 202 is configured to receive the secondary voltage VS and provide the ripple signal VD having the envelope of half sine wave. In the shown embodiment, the ripple contained in the ripple signal VD is mainly low frequency ripple, i.e., 100 Hz, which is the most common. A person of ordinary skill in the art should understand that the waveform of the ripple signal VD is not limited to that shown in FIG. 3, in other embodiments, the ripple signal VD could be any other non-ideal straight line form. Then referring to FIG. 3, the waveform of the filter signal VC is almost a straight line. When a bias signal is applied, the filter signal VC is larger than the average value of the ripple signal VD. It can be seen from FIG. 2, for MOSFET M1, the drain-source voltage Vds=VD−VOUT, and the gate-source voltage Vgs=VC−VOUT. In the time period P11 of FIG. 3, MOSFET M1 works in saturation region when the drain-source voltage Vds is not less than the difference between the gate-source voltage Vgs and the threshold voltage VTH of MOSFET M1 (i.e., VD≥VC−VTH). And in the time period P22 of FIG. 3, MOSFET M1 works in linear region when the source-drain voltage Vds is less than the difference between the gate-source voltage Vds and the threshold voltage VTH of MOSFET M1 (i.e., VD<VC−VTH).

When MOSFET M1 works in saturation region, its power loss can be expressed as Vds*ILOAD=(VD−VOUT)*ILOAD=(VD−VC+Vgs)*ILOAD, wherein ILOAD is the load current. when the load current ILOAD is much smaller than the maximum working current of MOSFET M1, that means Vgs≈VTH, the power loss is roughly equal to (VD−VC+VTH)*ILOAD. As shown in FIG. 3, compared with the prior art, the bias signal boosts the filter signal VC, and thus the power loss of MOSFET M1 in saturation region can be decreased. When MOSFET M1 works in linear region, its power loss is Rdson*ILOAD$^2$, wherein Rdson is the conduction resistor of MOSFET M1. The resistance of Rdson in linear region is very small, and thus the power loss in linear region may be negligible. Therefore, the power loss of MOSFET M1 in saturation region can be decreased when using the bias signal.

And then referring to FIG. 3, when MOSFET M1 working in saturation region, the output signal VOUT follows the filter signal VC, its waveform is almost a straight line. When MOSFET M1 starts to work in linear region, the ripple signal VD is smaller than VC−VTH, and the output signal VOUT no longer follows the filter signal VC, start to follow the ripple signal VD instead, and thus the output signal VOUT can contain the ripple contained in the ripple signal VD. In one embodiment, when the current ILOAD of the load 205 increases, the bias signal is increased, and when the current ILOAD of the load 205 decreases, the bias signal is decreased. As shown in FIG. 3, in light load, the current ILOAD and the power loss of MOSFET M1 in saturation region are small, thus a low bias signal may help to improve the ripple suppression of the power supply system. However, in high load, the reduction of the power loss of the MOSFET m1 is the most important, a high bias signal may help to provide high efficiency of the power supply system.

A person of ordinary skill in the art should know that in other embodiments, the bias signal can be to adjusted according to the actual applications, as discussed above, a high bias signal can be set to provide high efficiency of the power supply system, and a low bias signal can be set to improve the ripple suppression, the operation is omitted for clarify.

Figure 4:
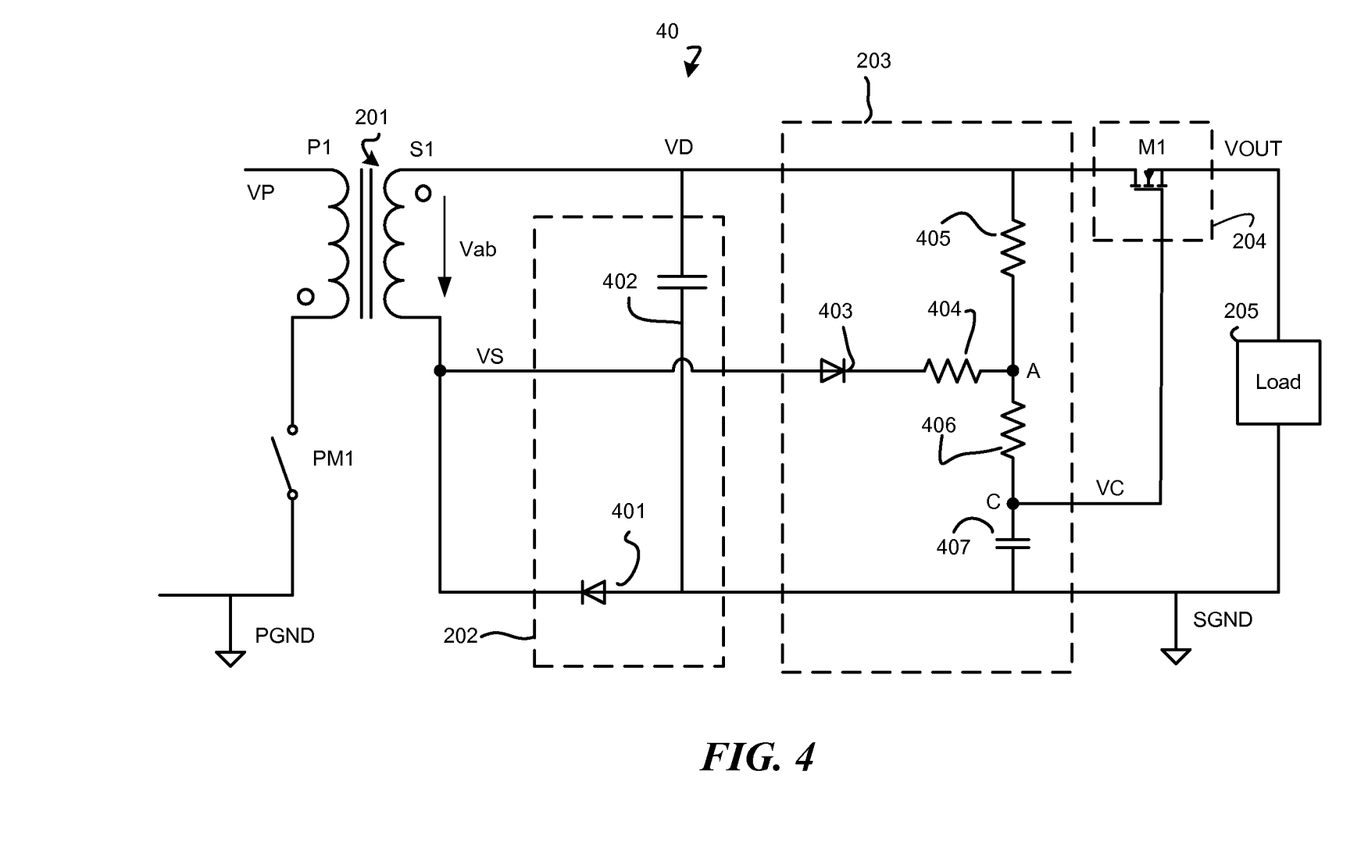
FIG. 4 illustrates a circuit diagram of an isolated power supply system 40 according to an embodiment of the present invention.

FIG. 4 illustrates a circuit diagram of an isolated power supply system 40 according to an embodiment of the present invention. As shown in FIG. 4, the isolated power supply system 40 comprises a transformer 201, a back-end regulation circuit 202, a ripple suppression circuit comprising a filter circuit 203 and a follower circuit 204, and a load 205. The transformer 201 comprises a primary winding P1 and a secondary winding S1. The primary winding P1 has a non-dotted terminal configured to receive a primary voltage VP and a dotted terminal coupled to a primary ground PGND through a main power switch PM1. In one embodiment, the primary voltage VP is a DC voltage obtained by rectifying and filtering an AC voltage. The secondary winding S1 has a non-dotted terminal configured to output a secondary voltage VS. The back-end regulation circuit 202 comprises a rectifier 401 and a filtering capacitor 402. In the shown embodiment, the rectifier 401 comprises a rectifying diode, wherein the anode of the rectifying diode is coupled to the secondary ground SGND and the cathode of the rectifying diode is coupled to the non-dotted terminal of the secondary winding S1. The filtering capacitor 203 has one end coupled to the dotted terminal of the secondary winding S1 to provide the ripple signal VD and the other end coupled to the secondary ground SGND. The filter circuit 203 comprises a first diode 403, a first resistor 404, a second resistor 405, a third resistor 406 and a first capacitor 407. The anode of the first diode 403 is coupled to the non-dotted terminal of the secondary winding S1. The first end of the first resistor 404 is coupled to the cathode of the first diode 403, the first end of the second resistor 405 is coupled to the second end of the first resistor 404, the common end of the first resistor 404 and the second resistor 405 is referred to as node A, the second end of the second resistor 405 is coupled to the dotted terminal of the secondary winding S1 and is referred to as node B. The first end of the third resistor 406 is coupled to the first end of the second resistor 405. The first capacitor 407 is coupled between the second end of the third resistor 406 and the secondary ground SGND, wherein the common end of the first capacitor 407 and the third resistor 406 is referred to as node C which is configured to as the output terminal to provide the filter signal VC. The follower circuit 204 comprises MOSFET M1, the gate of M1 is configured to receive the filter signal VC as the first input terminal of the follower circuit 204, the drain is configured to receive the ripple signal VD as the second input terminal of the follower circuit 204, the source is configured to provide the output signal VOUT as the output terminal of the follower circuit 204. The load 205 is coupled between the output terminal of the follower circuit 204 and the secondary ground SGND.

As shown in FIG. 4, in the stable state, when the main power switch PM1 is turned ON, the current flows from the non-dotted terminal to the dotted terminal of the primary winding P1, at the same time, an electromotive force which points in opposite direction is produced across the primary winding P1. Accordingly, an electromotive force is also produced across the secondary winding S1 and points from the dotted terminal to the non-dotted terminal. And thus the secondary voltage VS is the sum of the ripple signal VD and the electromotive force across the secondary winding S1. Then the rectifier 401 is turned OFF, the first diode 403 is turned ON, this makes the secondary voltage VS charge the first capacitor 407 through the second resistor 405 and the third resistor 406. The first resistor 404 and the second resistor 405 are used as a voltage divider, if the forward voltage drop across the first diode 403 is ignored, the potential of node A is VD+(VS−VD)*R2/(R1+R2), wherein VIN is the input voltage, N is the turn ratio of the transformer 201, R1 is the resistance of the first resistor 404, R2 is the resistance of the second resistor 405.

When the main power switch PM1 is turned OFF, an electromotive force which points from the non-dotted terminal to the dotted terminal is produced across the primary winding P1, this makes an electromotive force which points from the non-dotted terminal to dotted terminal is also produced across the secondary winding S1. And now the secondary voltage VS is the difference between the ripple signal VD and the electromotive force across the secondary winding S1. Then the rectifier 401 is turned ON, the first diode 403 is turned OFF. The first capacitor 407 is discharged to the load 205 through the third resistor 406 and the second resistor 405 when the filter signal VC is larger than the ripple signal VD. The ripple signal VD charges the first capacitor 407 through the second resistor 405 and the third resistor 406 when the filter signal VC is less than the ripple signal VD. Generally, the difference between the ripple signal VD and the filter signal VC is very small, the voltage drop across the second resistor 405 is very weak, and the potential of node A approximately equals the ripple signal VD.

To sum up, in the stable state, the voltage drop across the first capacitor 407, and the filter signal VC will fluctuate in the process of charge and discharge due to the ON and OFF actions of the main power switch PM1. If the time constant of the RC network consisting of the third resistor 406 and the first capacitor 407 is much larger than the cycle period of the low frequency ripple, is naturally much larger than the cycle period of the high frequency ripple caused by the ON and OFF actions of the main power switch PM1, the fluctuation of the filter signal VC is small enough and it is almost constant. The ripple signal VD and the secondary VS varies with time.

For one cycle period of the ripple signal VD, the energy balance dictates that the following equation should hold:

$$\int_0^T T_{on}\left\{V_D(t) + [V_S(t) - V_D(t)]\frac{R_2}{R_1 + R_2} - V_C\right\}dt - \qquad (1)$$

$$T_{OFF}[V_C - V_D(t)]dt = 0$$

Equation (2) illustrates the solving equation (1) for the filter signal VC:

$$V_C = \frac{\int_0^T V_D(t)dt}{T} + \frac{\int_0^T D[V_S(t) - V_D(t)]\left(\frac{R_2}{R_1 + R_2}\right)dt}{T} \qquad (2)$$

Wherein D is the duty cycle of the main power switch PM1, T is the cycle period of the ripple signal VD. In the shown embodiment, T=1/100 MHz. From equation (2), the filter signal VC is the sum of the average value of the ripple signal VD within a cycle period and a positive bias signal. The bias signal is determined by the duty cycle D of the main power switch PM1, the voltage drop across the secondary winding S1, the resistance of the first resistor 404 and the second resistor 405.

In some embodiments, the isolated power supply system 40 is configured to receive an AC voltage VAC as the input voltage. In the shown embodiment, the AC voltage VAC is AC 220V/50 Hz. The secondary voltage VS is determined by the AC voltage VAC and the turn ratio between the primary winding P1 and the secondary winding S1 of the transformer 201. In other embodiments, the isolated power supply system 40 further comprises a dimming circuit 206. In the shown embodiment, the isolated power supply system 40 further comprises a TRIAC as the dimming circuit, and the secondary voltage VS is further determined by the conduction angle of the TRIAC. A person of ordinary skill in the art should know that in other embodiments, the dimming circuit 206 may comprise other suitable device or circuit, e.g. MOSFET switch located in the primary part and controlled by a pulse modulation signal PWM.

Figure 5:
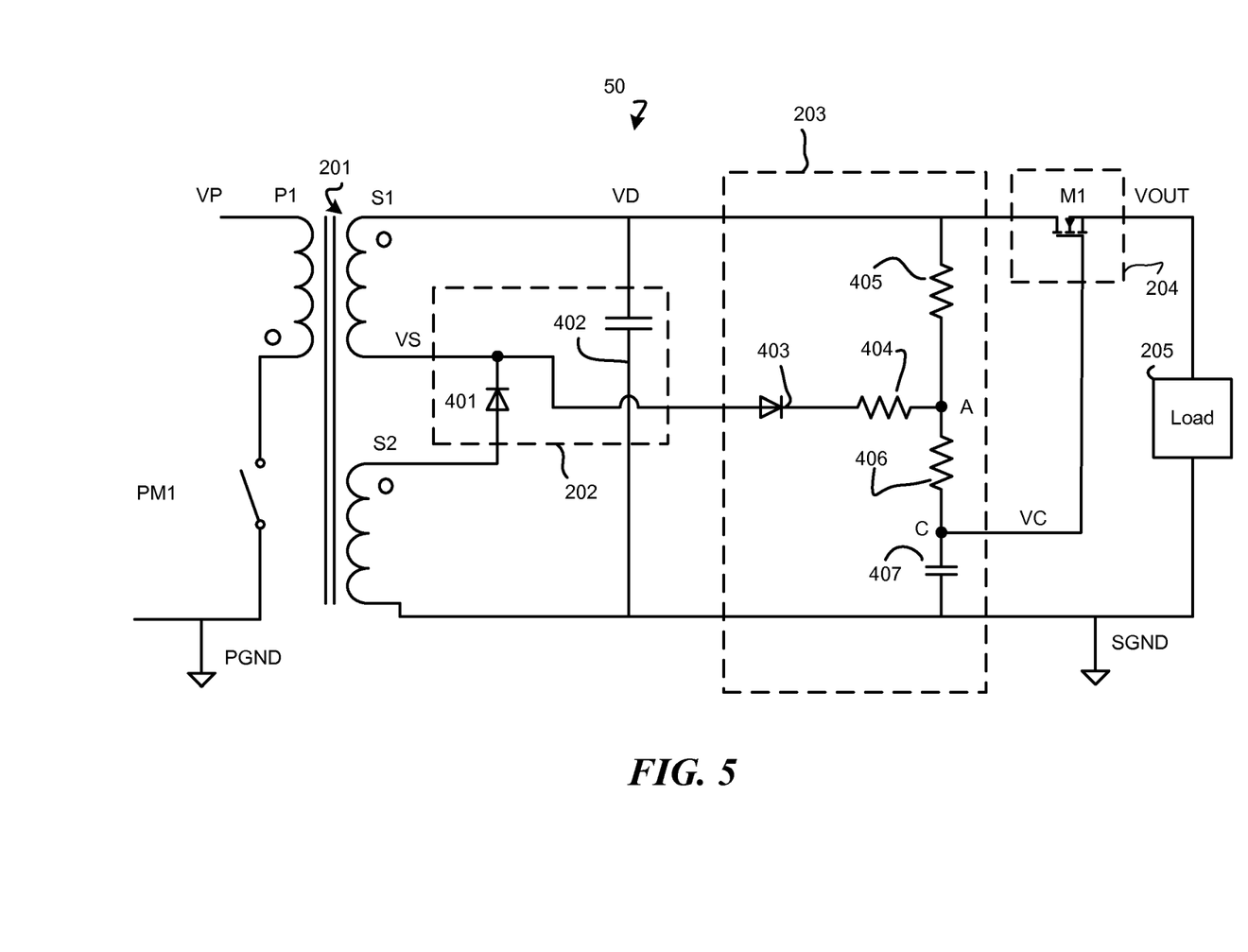
FIG. 5 illustrates a circuit diagram of an isolated power supply system 50 according to another embodiment of the present invention.

FIG. 5 illustrates a circuit diagram of an isolated power supply system 50 according to another embodiment of the present invention. Compared with the isolated power supply system 40 shown in FIG. 4, the transformer 201 of the isolated power supply system 50 in FIG. 5 further comprises a second secondary winding S2, wherein the dotted terminal of the second secondary winding S2 is coupled to the anode of the rectifier 401, and the non-dotted terminal is connected to the secondary ground SGND.

Compared with the isolated power supply system 40, under the same input voltage and the output voltage, the turn ratio between the primary winding P1 and the secondary winding S1 is reduced when the second secondary winding S2 is applied in the isolated power supply system 50, a smaller value of the secondary voltage VS is obtained and thus the low ripple frequency and the high frequency ripple contained in the filter signal VC can be reduced further.

Figure 6:
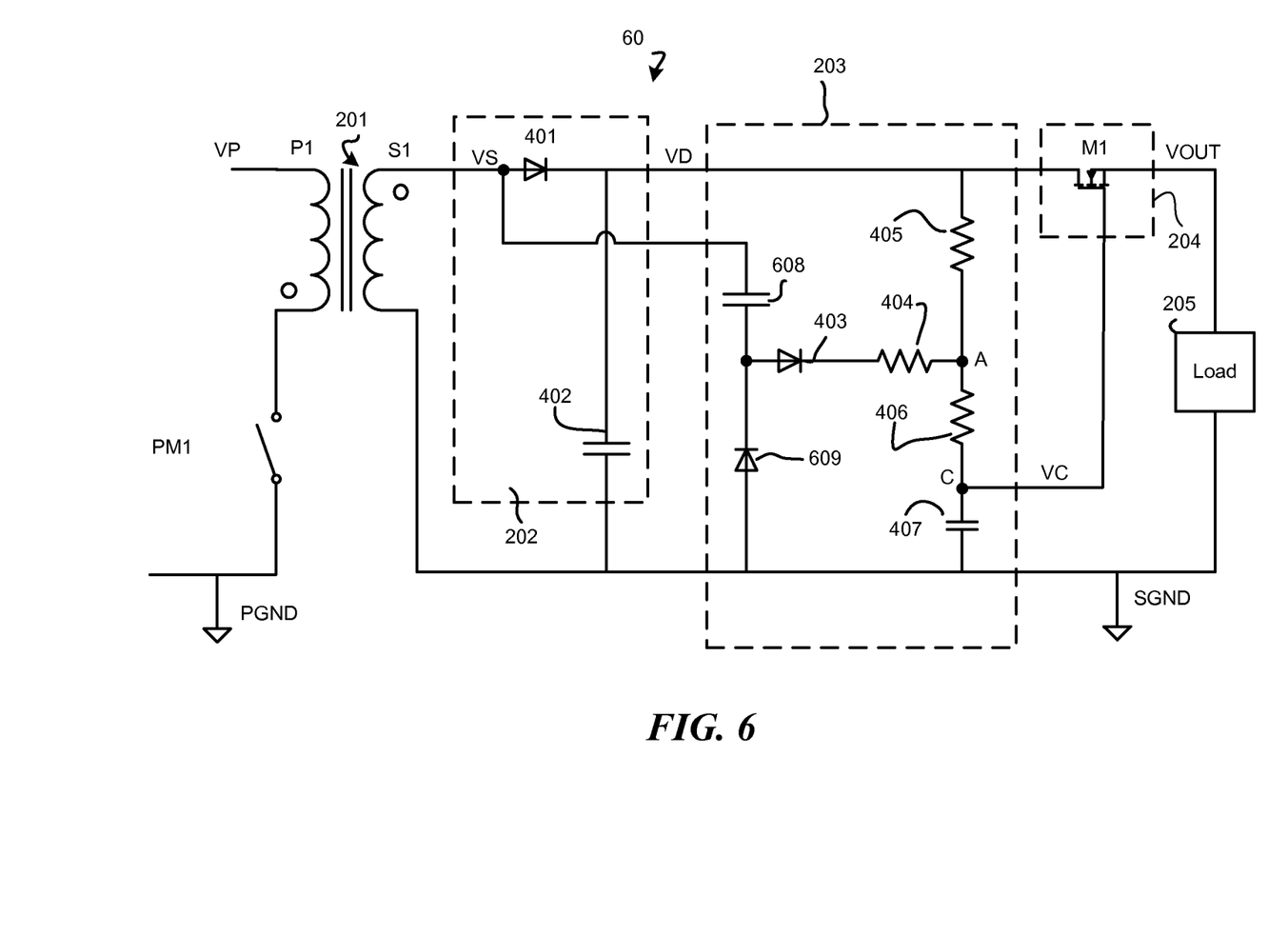
FIG. 6 illustrates a circuit diagram of an isolated power supply system 60 according to yet another embodiment of the present invention.

FIG. 6 illustrates a circuit diagram of an isolated power supply system 60 according to yet another embodiment of the present invention. Compared with the isolated power supply system 40, the connection of the rectifier 401 changes, in detail, the anode of the rectifier is coupled to the dotted terminal of the secondary winding S1, the cathode of the rectifier is coupled to one end of the filter capacitor 402 to provide the ripple signal VD. The non-dotted terminal of the secondary winding S1 is coupled to the secondary ground SGND. The secondary voltage VS is provided at the dotted terminal of the secondary winding S1. The filter circuit 203 further comprises a second capacitor 608 and a second diode 609. The second capacitor 608 has a first end coupled to the dotted terminal of the secondary winding S1. The anode of the second diode 609 is coupled to the secondary ground SGND, the cathode is coupled to the second end of the second capacitor 608. The anode of the first diode 403 is coupled to the common end of the second capacitor 608 and the second diode 609.

As shown in FIG. 6, in the stable state, when the main power switch PM1 is turned ON, the current flows from the non-dotted terminal to the dotted terminal of the primary winding P1, at the same time, an electromotive force which points in opposite direction is produced across the primary winding P1. Accordingly, an electromotive force is also produced across the secondary winding S1 and points from the dotted terminal to the non-dotted terminal. And now the secondary voltage VS is the difference between the secondary ground SGND and the electromotive force across the secondary winding S1, and is a negative voltage. Then the rectifier 401 is turned OFF, the first diode 403 is turned OFF, the second diode 609 is turned ON, this makes the second capacitor 608 is charged. The voltage drop across the second capacitor 608 is referred to as VS0. When the ripple signal VD is larger than the filter signal VC, the filter capacitor 402 charges the second capacitor 407 through the second resistor 405 and the third resistor 406. When the ripple signal VD is less than the filter signal VC, the second capacitor 407 is discharged to the load 205 through the second resistor 405 and the third resistor 406. If the second resistor 405 used for dividing voltage is ignored, the potential of node A equals with the ripple signal VD.

When the main power switch PM1 is turned OFF, an electromotive force which points from the non-dotted terminal to the dotted terminal is produced across the primary winding P1, this makes an electromotive force which points from the non-dotted terminal to dotted terminal is also produced across the secondary winding S1. And now the secondary voltage VS approximately equals the ripple signal VD. Then the rectifier 401 is turned ON, the second diode 609 is turned OFF. The voltage across the second capacitor 608 cannot be changed sudden, and thus the potential of the common end of the second capacitor 608 and the second diode 609 is VD+VS0, wherein VS0 equals the voltage drop across the secondary winding S1. The first diode 403 is turned ON, the first capacitor 407 is charged by the current through the first resistor 404 and the third resistor 406. The potential of node A is VD+VS0*R2/(R1+R2) when considering the dividing of the first resistor 405 and the second resistor 406.

Similarly, in the stable state, the voltage drop across the first capacitor 407, and the filter signal VC will fluctuate in the process of charge and discharge due to the ON and OFF actions of the main power switch PM1. If the time constant of the RC network consisting of the third resistor 406 and the first capacitor 407 is much larger than the cycle period of the low frequency ripple, is naturally much larger than the cycle period of the high frequency ripple caused by the ON and OFF actions of the main power switch PM1, the fluctuation of the filter signal VC is small enough and it is almost constant. Thus the ripple signal VD and the secondary VS varies with time.

For one cycle period of the ripple signal VD, the energy balance dictates that the following equation should hold:

$$\int_0^T T_{OFF}\left[V_D(t) + V_{S0}(t)\left(\frac{R_2}{R_1 + R_2}\right) - V_C\right]dt - T_{ON}[V_C - V_D(t)]dt = 0 \quad (3)$$

Equation (4) illustrates the solving equation (3) for the filter signal VC:

$$V_C = \frac{\int_0^T V_D(t)dt}{T} + \frac{R_2}{R_1 + R_2}\frac{\int_0^T (1-D)V_{S0}(t)dt}{T} \quad (4)$$

Wherein D is the duty cycle of the main power switch PM1, T is the cycle period of the ripple signal VD. In the shown embodiment, T=1/100 MHz. From equation (4), the filter signal VC is the sum of the average value of the ripple signal VD within a cycle period and a positive bias signal. The bias signal is determined by the duty cycle D of the main power switch PM1, the voltage VS0, and the resistance of the first resistor 404 and the second resistor 405.

In some embodiments, the isolated power supply system 60 receives an AC voltage VAC as an input voltage. For example. AC 220V/50 Hz. The voltage VS0 is determined by the AC voltage VAC, and the turn ratio between the primary winding P1 and the secondary winding S1 of the transformer 201. In other embodiments, the isolated power supply system 60 further comprises a dimming circuit 206. In the shown embodiment, the isolated power supply system 60 further comprises a TRIAC as the dimming circuit 206, and the voltage VS0 is further determined by the conduction angle of the TRIAC. A person of ordinary skill in the art should know that in other embodiments, the dimming circuit 206 may comprise other suitable device or circuit, e.g. MOSFET switch controlled by a pulse modulation signal PWM.

Figure 7:
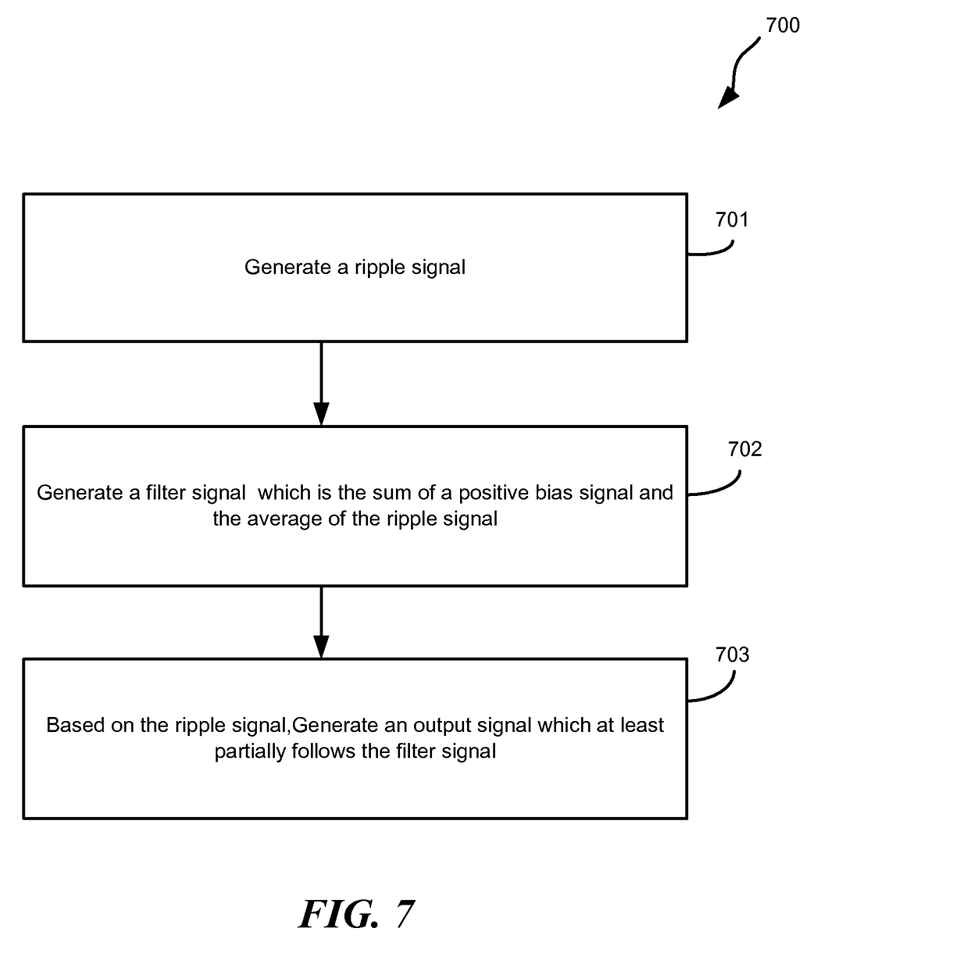
FIG. 7 illustrates a working-flow diagram of a method 700 of ripple suppression according to an embodiment of the present invention.

FIG. 7 illustrates a working-flow diagram of a method 700 of ripple suppression according to an embodiment of the present invention. As shown in FIG. 7, the method of ripple suppression comprises steps S701~S703.

At step S701, a ripple signal VD is generated by a signal source.

At step S702, a filter signal VC is generated and the filter signal VD is the sum of the average value of the ripple signal VD and a positive bias signal.

At step S703, based on the ripple signal VD and the filter signal VC, and an output signal VOUT is generated. The output signal VOUT at least partially follows the change of filter signal VC.

In one embodiment, the ripple signal VD, the filter signal VC, the bias signal and the output signal VOUT are all voltage signals, i.e., the ripple signal VD is a ripple voltage, the filter signal is a filter voltage, and the output signal VOUT is an output voltage.

In one embodiment, the output signal VOUT is equal to the difference between the filter signal VC and a threshold signal when the ripple signal VD is larger than the difference between the filter signal VC and the threshold signal, and the output signal VOUT follows the ripple signal VD when the ripple signal VD is smaller than the difference between the filter signal VC and the threshold signal.

In one embodiment, the signal source is an isolated converter, wherein the step S702 further comprises: a secondary voltage VS is generated at a terminal of a secondary winding of the isolated converter; the secondary voltage VS and the ripple signal VD are inputted the filter circuit, the filter circuit is further coupled to the secondary ground SGND, and a filter signal VC is generated.

In one embodiment, the ripple signal VD contains periodic ripple.

In one embodiment, the isolated converter has a main power switch, the secondary voltage VS is generated at the non-dotted terminal of the secondary winding. When the main power switch is turned ON, the secondary voltage VS makes the filter voltage VC rise. When the main power switch is turned OFF, if the filter signal VC is larger than the ripple signal VD, the ripple signal VD makes the filter signal VC drop, and if the filter signal VC is smaller than the ripple signal VD, the ripple signal VD makes the filter signal VC rise.

In one further embodiment, the isolated converter has a second secondary winding, when the main power switch is turned OFF, the secondary winding and the second secondary winding together make the ripple signal VD rise.

In another embodiment, the isolated converter has a main power switch, the secondary voltage VS is generated at the dotted terminal of the secondary winding. When the main power switch is turned ON, the secondary voltage VS charges a capacitor, if the filter signal VC is larger than the ripple signal VD, the ripple signal VD makes the filter signal VC drop, and if the filter signal VC is smaller than the ripple signal VD, the ripple signal VD makes the filter signal VC rise. When the main power switch is turned OFF, the sum of the voltage across the capacitor and the ripple signal VC make the filter signal VC rise.

Obviously many modifications and variations of the present invention are possible in light of the above teachings. It is therefore to be understood that within the scope of the appended claims the invention may be practiced otherwise than as specifically described. It should be understood, of course, the foregoing invention relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

We claim:

1. A ripple suppression circuit, comprising:
a filter circuit having a first input terminal and an output terminal, wherein the first input terminal is coupled to a signal source to receive a ripple signal, wherein based on the ripple signal, the filter circuit provides a filter signal at the output terminal, and wherein the filter signal is the sum of the average value of the ripple signal and a positive bias signal;
a follower circuit having a first input terminal, a second input terminal and an output terminal, wherein the first input terminal is coupled to the signal source to receive the ripple signal, the second input terminal is coupled to the output terminal of the filter circuit to receive the filter signal, wherein based on the ripple signal and the filter signal, the follower circuit provides an output signal at the output terminal, and wherein the output signal at least partially follows the filter signal.

2. The ripple suppression circuit of claim 1, wherein the ripple signal, the filter signal, the bias signal and the output signal are all voltage signals.

3. The ripple suppression circuit of claim 1, wherein the follower circuit comprises a MOSFET having a gate terminal, a drain terminal and a source terminal, wherein the gate terminal of the MOSFET is coupled to the output terminal of the filter circuit to receive the filter signal, the drain terminal is coupled to the signal source to receive the ripple signal, the source terminal is configured to provide the output signal.

4. The ripple suppression circuit of claim 1, wherein the ripple suppression circuit is used in an isolated power supply system which has a main power switch, a primary winding coupled to the main power switch, a secondary winding having a first terminal and a second terminal configured to provide a secondary voltage, and a rectifier coupled to the second terminal of the secondary winding, and wherein the filter circuit further comprises a second input terminal configured to receive the secondary voltage and a third input terminal coupled to a secondary ground of the isolated power supply system.

5. The ripple suppression circuit of claim 4, wherein the filter circuit comprises:

a first diode having an anode and a cathode, wherein the anode is coupled to the second terminal of the secondary winding;
a first resistor having a first end and a second end, wherein the first end is coupled to the cathode of the first diode;
a second resistor having a first end and a second end, wherein the first end is coupled to the second end of the first resistor, the second end is coupled to the first terminal of the secondary winding to receive the ripple signal;
a third resistor having a first end and a second end, wherein the first end is coupled to the first end of the second resistor; and
a first capacitor coupled between the second end of the third resistor and the secondary ground;
wherein the common end of the first capacitor and the third resistor is configured to output the filter signal.

6. The ripple suppression circuit of claim 4, wherein the filter circuit comprises:

a first diode having an anode and a cathode, wherein the anode is coupled to the first terminal of the secondary winding;
a second diode having an anode and a cathode, wherein the anode is coupled to the cathode of the first diode;
a first resistor having a first end and a second end, wherein the first end is coupled to the cathode of the second diode;
a second resistor having a first end and a second end, wherein the first end is coupled to the second end of the first resistor, the second end is coupled to the rectifier to receive the ripple signal;
a third resistor having a first end and a second end, wherein the first end is coupled to the first end of the second resistor; and
a first capacitor coupled between the second end of the third resistor and the secondary ground; and
a second capacitor coupled between the cathode of the first diode and the second terminal of the secondary winding;
wherein the common end of the first capacitor and the third resistor is configured to output the filter signal.

7. A power supply system with a ripple suppression circuit, comprising:

a signal source configured to output a ripple signal; and
a ripple suppression circuit comprising a filter circuit and a follower circuit, wherein the filter circuit has a first input terminal coupled to the signal source to receive the ripple signal and an output terminal configured to output a filter signal which is the sum of the average value of the ripple signal and a positive bias signal, and wherein the follower circuit has a first input terminal coupled to the signal source to receive the ripple signal, a second input terminal coupled to the filter circuit to receive the filter signal and an output terminal configured to provide an output signal to a load, wherein the output signal at least partially follows the change of the filter signal.

8. The power supply system of claim 7, wherein the load comprises LED strings, and the signal source is configured to receive a periodic AC signal from a bidirectional controlled silicon switch (TRIAC) dimming circuit.

9. The power supply system of claim 7, wherein the bias signal increases when the load current increases, and decreases when the load current decreases.

10. The power supply system of claim 7, wherein
the signal source comprises a transformer comprising a primary winding and a first secondary winding, each winding has a first terminal and a second terminal, wherein a primary voltage is provided at the first terminal of the primary winding, a secondary voltage is provided at the second terminal of the first secondary winding, and the signal source further comprises a back-end regulation circuit, which is coupled to the two terminals of the first secondary winding and a secondary ground and is configured to output the ripple signal; and the filter circuit further has a second input terminal configured to receive the secondary voltage and a third input terminal coupled to the secondary ground, wherein based on the secondary voltage and the ripple signal, the filter circuit outputs the filter signal at the output terminal.

11. The power supply system of claim 10, wherein the back-end regulation circuit comprises:
a rectifier having an anode and a cathode, wherein the anode is coupled to the secondary ground, the cathode is coupled to the second terminal of the first secondary winding to provide the secondary voltage;
a filter capacitor having a first end and a second end, wherein the first end is coupled to the first terminal of the first secondary winding to provide the ripple signal, the second end is coupled to the secondary ground;

the filter circuit comprises:
a first diode having an anode and a cathode, wherein the anode is coupled to the second terminal of the first secondary winding;
a first resistor having a first end and a second end, wherein the first end is coupled to the cathode of the first diode;
a second resistor having a first end and a second end, wherein the first end is coupled to the second end of the first resistor, the second end is coupled to the first terminal of the first secondary winding to receive the ripple signal;
a third resistor having a first end and a second end, wherein the first end is coupled to the first end of the second resistor;
a first capacitor coupled between the second end of the third resistor and the secondary ground; and
wherein the common end of the first capacitor and the third resistor is configured to output the filter signal.

12. The power supply system of claim 11, the transformer further comprises a second secondary winding having a first terminal and a second terminal, wherein the first terminal is coupled to the anode of the rectifier, the second terminal is coupled to the secondary ground.

13. The power supply system of claim 10, wherein:
the back-end regulation circuit comprises:
a rectifier having an anode and a cathode, wherein the anode is coupled to the second terminal of the first secondary winding to provide the secondary voltage;
a filter capacitor having a first end and a second end, wherein the first end is coupled to the cathode of the rectifier to provide the ripple signal, the second end is coupled to the secondary ground;

the filter circuit comprises;
a first diode having an anode and a cathode, wherein the anode is coupled to the first terminal of the first secondary winding;
a second diode having an anode and a cathode, wherein the anode is coupled to the cathode of the first diode;
a first resistor having a first end and a second end, wherein the first end is coupled to the cathode of the second diode;
a second resistor having a first end and a second end, wherein the first end is coupled to the second end of the first resistor, the second end is coupled to the rectifier to receive the ripple signal;
a third resistor having a first end and a second end, wherein the first end is coupled to the first end of the second resistor; and
a first capacitor coupled between the second end of the third resistor and the secondary ground;
a second capacitor coupled between the cathode of the first diode and the second terminal of the first secondary winding; and
wherein the common end of the first capacitor and the third resistor is configured to output the filter signal as the output terminal of the filter circuit.

14. The power supply system of claim 7, wherein the follower circuit comprises a MOSFET having a gate terminal, a drain terminal and a source terminal, wherein the gate terminal of the MOSFET is coupled to the output terminal of the filter circuit to receive the filter signal, the drain terminal is coupled to the signal source to receive the ripple signal, the source terminal is configured to provide the output signal.

15. A method of ripple suppression having a filter circuit and a follower circuit, comprising steps of:
generating a ripple signal;
generating a filter signal which is the sum of the average value of the ripple signal and a positive bias signal; and
generating an output signal based on the ripple signal and the filter signal, wherein the output signal at least partially follows the filter signal.

16. The method of claim 15, wherein the ripple signal, the filter signal, the bias signal and the output signal are all voltage signals.

17. The method of claim 15, wherein the output signal is equal to the difference between the filter signal and a threshold signal when the ripple signal is larger than the difference between the filter signal and the threshold signal, and the output signal follows the ripple signal when the ripple signal is smaller than the difference between the filter signal and the threshold signal.

* * * * *